United States Patent [19]
Takeo et al.

[11] Patent Number: 5,764,795
[45] Date of Patent: Jun. 9, 1998

[54] COLOR IMAGE PROCESSING APPARATUS FOR COLOR MATCHING AND COLOR MATCHING PROCESSING METHOD

[75] Inventors: Nobuyuki Takeo; Hitoshi Ogatsu; Shinji Kita, all of Ebina, Japan

[73] Assignee: Fuji Xerox Co., Ltd., Tokyo, Japan

[21] Appl. No.: 590,937

[22] Filed: Jan. 24, 1996

[30] Foreign Application Priority Data

Jan. 26, 1995 [JP] Japan .................... 7-010763
Mar. 3, 1995 [JP] Japan .................... 7-044207

[51] Int. Cl.⁶ ........................................ H04N 1/60
[52] U.S. Cl. .................... 382/167; 358/520; 358/529
[58] Field of Search ............................ 358/518, 520, 358/523, 529, 506; 382/162, 167; H04N 1/60

[56] References Cited

U.S. PATENT DOCUMENTS

| | | |
|---|---|---|
| 4,500,919 | 2/1985 | Schreiber . |
| 4,837,722 | 6/1989 | Sara . |
| 4,941,038 | 7/1990 | Walowit . |
| 5,008,742 | 4/1991 | Shigaki et al. ................ 358/529 |
| 5,185,661 | 2/1993 | Ng . |
| 5,272,468 | 12/1993 | Read . |
| 5,285,297 | 2/1994 | Rose et al. . |
| 5,295,000 | 3/1994 | Nonoshita et al. . |
| 5,321,797 | 6/1994 | Morton . |
| 5,331,440 | 7/1994 | Kita et al. ................ 358/529 |
| 5,359,436 | 10/1994 | Dichter et al. ................ 358/529 |
| 5,608,549 | 3/1997 | Usami ................ 358/523 |

FOREIGN PATENT DOCUMENTS

A-2-87192  3/1990  Japan .

*Primary Examiner*—Kim Yen Vu
*Attorney, Agent, or Firm*—Oliff & Berridge, PLC

[57] ABSTRACT

Three-dimensional LUTs produce a lightness signal L* from input color signals C, M and Y. The three-dimensional LUTs are respectively provided for four divisional sections of an input color signal K. A three-dimensional LUT switching device judges to what section a current value of the input color signal K belongs. A selector selects one of the LUTs in accordance with a judgment result. Similar processing is performed for chromaticity signals a* and b*. According to another aspect of the invention, three-dimensional LUT color converters produce color signals $L_2^*$, $a_2^*$ and $b_2^*$ based on only input color signals C, M and Y. A position in the L*a*b* space of the color signals $L_2^*$, $a_2^*$ and $b_2^*$ has a deviation from a position of color signals $L_1^*$, $a_1^*$ and $b_1^*$ to be output actually. Based on an input color signal K, a one-dimensional LUT produces a lightness signal $L_3^*$, which corresponds to the deviation. A color signal combining means produces final output color signals $L_1^*$, $a_1^*$ and $b_1^*$ based on the color signals $L_2^*$, $a_2^*$ and $b_2^*$ and the lightness signal $L_3^*$.

16 Claims, 16 Drawing Sheets

COLOR IMAGE PROCESSING APPARATUS FOR COLOR MATCHING AND COLOR MATCHING PROCESSING METHOD

BACKGROUND OF THE INVENTION

1. Field of the Invention

The present invention relates to a color image processing apparatus suitable for format conversion of a color image.

2. Description of the Related Art

To allow image output from a color printer, a color copier, etc., color conversion needs to be performed beforehand. For example, in a color copier, it is a general procedure that a document is read by a CCD line sensor or the like and reading results are output as additive mixture signals of RGB (red, green, and blue). On the other hand, image outputting is performed based on subtractive mixture signals of CMYK (cyan, magenta, yellow, and black). Therefore, color conversion processing in a color copier is performed with an assumption that particular input/output sections such as the above-mentioned ones are used. That is, a color conversion circuit is so adjusted that a test pattern (an original) and its copy resemble to as high a degree as possible.

In a color printer, color conversion to recording color signals is performed with an assumption that given "representative signals" are supplied as input color signals. In general, NTSC RGB signals, which are used in television etc., are used as the representative signals. That is, color conversion processing is performed so that a test pattern of NTSC RGB signals displayed on a display and its printed result resemble to as high a degree as possible.

At present, there exist a variety of color input/output media and accordingly there are a variety of image data formats. Since image data are exchanged through a network or the like, it is now necessary to perform color conversion processing on various kinds of image data. Among several typical color spaces used in personal computers etc. are (1) the RGB space, (2) the HSL and HSB color spaces that are defined from the RGB space by rearranging calculations, (3) the CMYK space that use recording colors themselves. While the number of available color spaces is small, there exist many image data formats. This is because there exist many data formats that are device-dependent, i.e., dependent on a particular device.

For example, in general, RGB signals output from a color scanner are different from NTSC RGB signals. Further, there occur differences in signals produced by plural kinds of color scanners due to differences in spectral responses of sensors used therein. Similarly, even with the use of the same CMYK signals, printed colors are different if different sets of colorants are used. As such, most of RGB signals of a color scanner as well as most of CMYK signals of a printer or the like are device-dependent signals.

To use device-dependent signals in another device, it is necessary to specify a corresponding relationship (color matching) between the device-dependent signals and device-independent signals. "Device-independent signals" mean signals that can be transformed, by known definitive equations, into signals on a calorimetric color space (CIE XYZ, L*a*b*, L*u*v*, etc.). The above-mentioned NTSC RGB signals are device-independent signals.

It is a common procedure (digital color proofing) that prior to making of a plate for printed materials, printing is performed based on image data and color reproduction performance is checked on printed materials. Where a color printer is used for this purpose, color matching should be of particularly high precision. On other hand, since device-dependent signals are nonlinear, it is difficult to express highly precise color matching by equations. For example, there is known a method in which matrix-type color conversion processing is performed while conversion coefficients are switched in accordance with the kind of input color signals. However, this method cannot attain sufficiently high color reproduction accuracy, and hence is not usable for the digital color proofing or the like.

It is a common understanding that the table-reference-type color conversion method is most appropriate for correct color matching (see, for instance, Japanese Unexamined Patent Publication No. Hei. 2-87192). According to this method, a look-up table (LUT) for defining a corresponding relationship between input color signals and output color signals is provided, and output signals are obtained by reading out the LUT based on input color signals. Therefore, even if a corresponding relationship between input color signals and output color signals is nonlinear, highly precise color matching can be realized by increasing the resolution of the LUT.

However, in the table-reference-type color conversion method, the necessary memory capacity increases exponentially with the number of parameters of input color signals. For example, where the number of gradations of each parameter of output color signals is 256 and each parameter of input color signals is divided into 16 regions, a three-dimensional table requires a memory capacity of $17^3$ (about 5 Kbytes) for each parameter of output color signals. A four-dimensional table requires a memory capacity of $17^4$ (about 85 Kbytes).

That is, if input color signals are CMYK signals, a vast memory capacity is needed. Further, in many cases, a table output result itself is not used as output color signals, but a result of an interpolating operation on a plurality of table output results is used as output color signals. In this case, the degree of complexity of the interpolating operation increases in an exponential manner with the number of parameters.

SUMMARY OF THE INVENTION

The present invention has been made in view of the above circumstances, and has an object of providing a color image processing apparatus which can perform simple, highly accurate color matching on CMYK signals.

To attain the above object, according to the invention, there is provided a color image processing apparatus for converting input color signals of a first color system consisting of intensities of cyan, magenta, yellow, and black into color signals of a given, second color system, comprising:

first converting means provided in association with a first intensity of black, for producing first color signals from the intensities of cyan, magenta, and yellow of the input color signals;

second converting means provided in association with a second intensity of black, for producing second color signals from the intensities of cyan, magenta, and yellow of the input color signals; and selecting means for selecting one of the first and second converting means in accordance with the intensity of black of the input color signals.

According to another aspect of the invention, there is provided a color image processing apparatus for converting input color signals of a first color system consisting of intensities of cyan, magenta, yellow, and black into color signals of a given, second color system, comprising:

first converting means provided in association with a first intensity of black, for producing first color signals from the intensities of cyan, magenta, and yellow of the input color signals;

second converting means provided in association with a second intensity of black, for producing second color signals from the intensities of cyan, magenta, and yellow of the input color signals; and interior division calculating means for calculating an interior division ratio between the first intensity of black and the second intensity of black based on an intensity of black of the input color signals; and interpolating means for performing an interpolating operation on the first color signals and the second color signals in accordance with the interior division ratio calculated by the interior division calculating means.

According to a further aspect of the invention, there is provided a color image processing apparatus for converting input color signals of a first color system consisting of intensities of cyan, magenta, yellow, and black into color signals of a given, second color system, comprising:

converting means for producing first color signals from the intensities of cyan, magenta, and yellow of the input color signals;

correction value producing means for producing a correction value based on the intensity of black of the input color signals; and color signal correcting means for producing second color signals of the second color system based on the first color signals produced by the converting means and the correction value produced by the correction value producing means.

DESCRIPTION OF THE PREFERRED EMBODIMENTS

Principle of Operation-I

As an example of color matching, a case of converting input color signals of CMYK to output color signals of L*a*b* will be described. In this case, mapping from a four-dimensional space of CMYK to a three-dimensional space of L*a*b* is uniquely determined as follows:

$$(L^*,a^*,b^*)=F(C,M,Y,K) \qquad (1)$$

If the CMY colors are varied with the K color fixed, a variation range of output color signals is expressed by a solid body in the L*a*b* space. According to the inventors' studies, the volume of the solid body decreases as the intensity of the K color increases. Therefore, in a range where the intensity of the K color is high, a color difference due to a variation of the CMY colors of the input color signals is small.

Therefore, in such a range, even if the K color is expressed by a smaller number of bits, the precision of the color conversion can be kept sufficiently high. That is, although the error of an interpolating operation increases as the lattice point interval of the K color increases, even a result obtained by approximation has sufficiently high accuracy when a solid body in the L*a*b* space has a small volume. Thus, satisfactory results can be obtained by making the lattice point interval of the K color narrow in a range where the K-color intensity is low, and making it wide in a range where the K-color intensity is high.

As is understood from the above discussion, 4-input/3-out color conversion in which the input color signals are CMYK colors, can be realized by combining 3-input/3-output look-up tables. This allows high-precision color matching while suppressing increase of the necessary memory capacity.

Embodiment 1

A first embodiment of the invention will be described with reference to FIG. 1.

Figure 1:
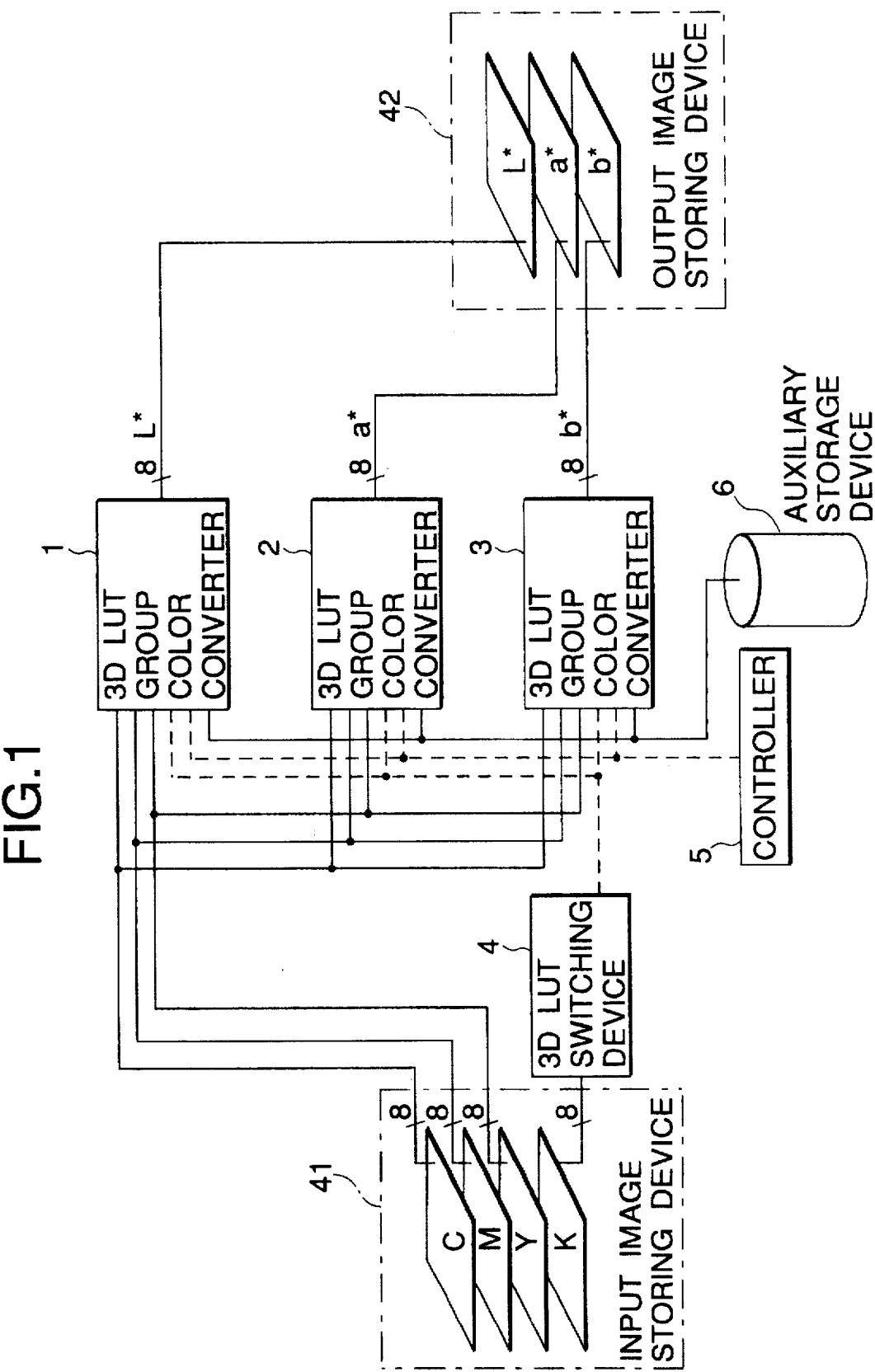
FIG. 1 is a block diagram showing a configuration of a first embodiment of the present invention.

In FIG. 1, an input image storing device 41 stores input color signals. The input color signals are CMYK data in which the intensity of each color is expressed by a dot area ratio of 256 gradations (8 bits) with an assumption of a given printer. Three-dimensional LUT group color converters 1–3 respectively produce output color signals L*, a* and b* based on CMY components of the input color signals. That is, the three-dimensional LUT group color converters 1–3 output left-side values of Equation (1).

Each of the three-dimensional LUT group color converters 1–3 is provided with a plurality of look-up tables corresponding to respective intensity values of the K color. A three-dimensional LUT switching device 4 produces, based on the K-color component of the input color signals, a LUT selection signal for designating look-up tables to be used of the three-dimensional LUT group color converters 1–3. An output image storing device 42 stores output color signals of the three-dimensional LUT group color converters 1–3. The output image storing device 42 consists of three planes (L* plane, a* plane, and b* plane) that are independently readable and writable. Respective components of the output color signals are stored in those planes.

An auxiliary storage device 6 stores in advance the contents of the look-up tables to be stored in the three-dimensional LUT group color converters 1–3. A controller 5 transfers the contents of the look-up tables to the three-dimensional LUT group color converters 1–3 before they are used.

Figure 4:
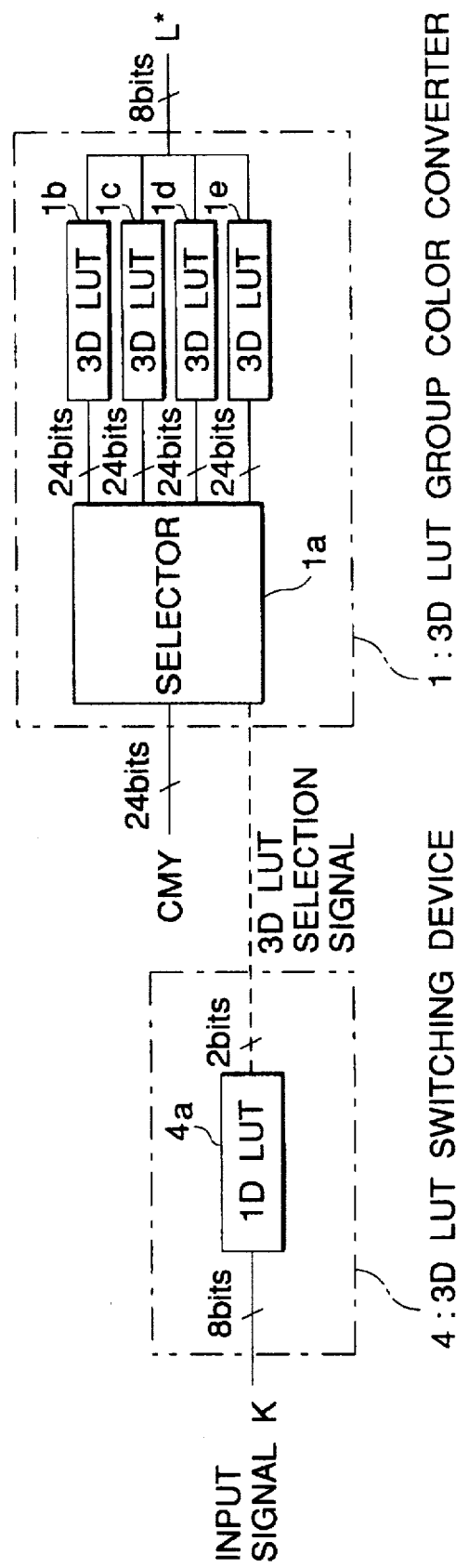
FIG. 4 is a block diagram showing a detailed configuration of a three-dimensional LUT group color converter 1 and a three-dimensional LUT switching device 4.

Referring to FIG. 4, detailed configurations of the three-dimensional LUT group color converter 1 and the three-dimensional LUT switching device 4.

In FIG. 4, the three-dimensional LUT switching device 4 incorporates a one-dimensional LUT 4a. The one-dimensional LUT 4a produces the above-mentioned LUT selection signal (2 bits) based on to what section the K-color component (8 bits) of the input color signals belongs, details of which operation is shown in FIG. 5.

Figure 5:
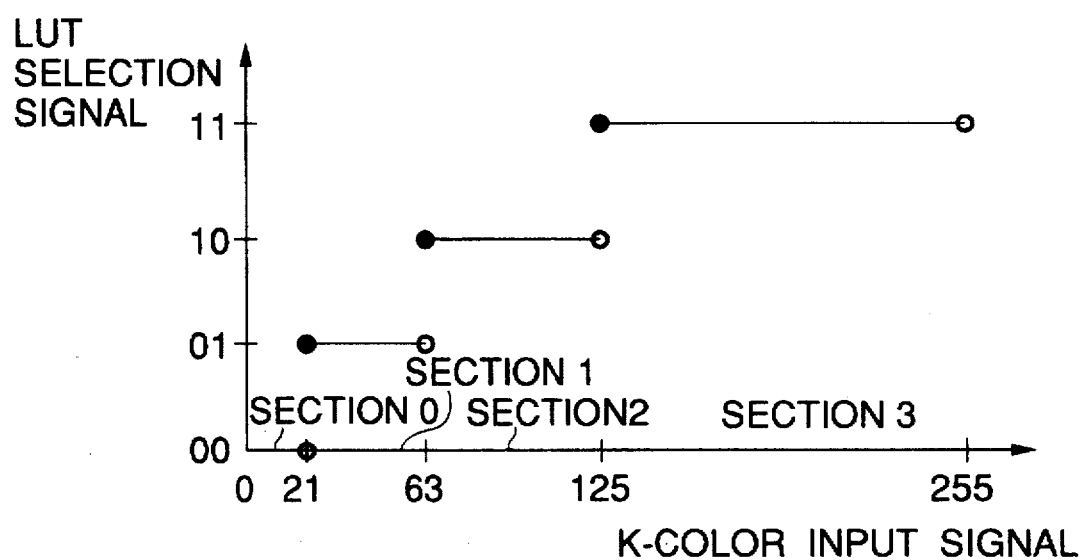
FIG. 5 illustrates the operation of the three-dimensional LUT switching device 4.

In FIG. 5, the horizontal axis represents a variation range (0 to 255) of the K-color component, which range is divided into four sections, i.e., section 0 to section 3. That is, K-color values of "0" to "20" belong to section 0; "21" to "62" belong to section 1; "63" to "125" belong to section 2; and "126" to "255" belong to section 3. One of binary, 2-bit data "00B" to "11B" (B means a binary number) representing the respective section numbers is set as the LUT selection signal.

As seen from FIG. 5, the respective sections have different widths; that is, the section becomes wider as the K-color intensity increases. This is to attain sufficiently high color conversion accuracy even with a small number of bits that represent the K color, as described in "Principle of operation-I."

Returning to FIG. 4, the three-dimensional LUT group color converter 1 has three-dimensional LUTs 1b–1e, which correspond to section 0 to section 3, respectively. One-input/4-output selector 1a supplies CMY components of input color signals to one of the three-dimensional LUTs 1b–1e corresponding to the LUT selection signal. A detailed configuration of the three-dimensional LUT 1b will be described with reference to FIG. 2.

Figure 2:
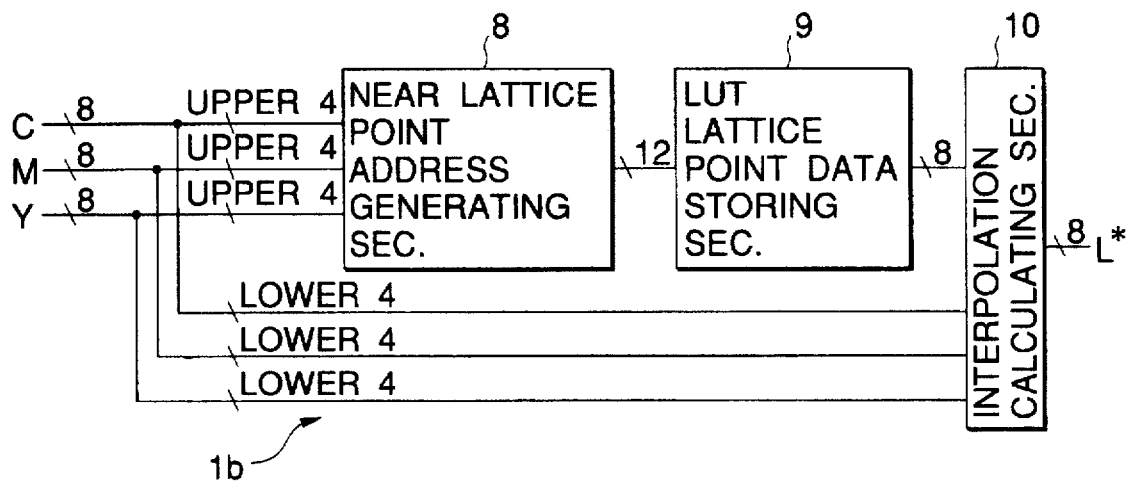
FIG. 2 is a block diagram showing a detailed configuration of a three-dimensional LUT 1b.

In FIG. 2, a LUT lattice point data storing section 9 stores lattice point data of the lightness signal L* of the output color signals with upper 4 bits (hereinafter called upper nibbles $C_U$, $M_U$ and $Y_U$) of the CMY colors of the input color signals used as parameters. The lattice point data may be determined by one of various known methods. For example, Neugebauer's equation (see "Theories of Color Reproduction," published by Publication Department of the Japanese Society of Printing Science and Technology, pp. 234) may be used. Alternatively, a high-order polynomial may be determined by a least squares method based on a plurality of color samples as combinations of dot area ratios and their color measurement values. As a further alternative, the lattice point data may be determined by learning of a neural network.

Upon reception of upper nibbles $C_U$, $M_U$ and $Y_U$, a near lattice point address generating section 8 sequentially supplies, to the LUT lattice point data storing section 9, address signals corresponding to plural sets of upper nibbles $(C_U, M_U, Y_U)$, $(C_U, M_U, Y_U+1)$, $(C_U, M_U+1, Y_U)$, $(C_U, M_U+1, Y_U+1)$, $(C_U+1, M_U, Y_U)$, $(C_U+1, M_U, Y_U+1)$, $(C_U+1, M_U+1, Y_U)$, and $(C_U+1, M_U+1, Y_U+1)$. In response, the LUT lattice point data storing section 9 sequentially outputs corresponding eight lightness signals L*. To accommodate a case where one of the upper nibbles $C_U$, $M_U$ and $Y_U$ is "1111," the LUT lattice point data storing section 9 stores a lightness signal L* corresponding to a value "10000." Therefore, the number of lattice points corresponding to a set of 4-bit components is 17.

Figure 3:
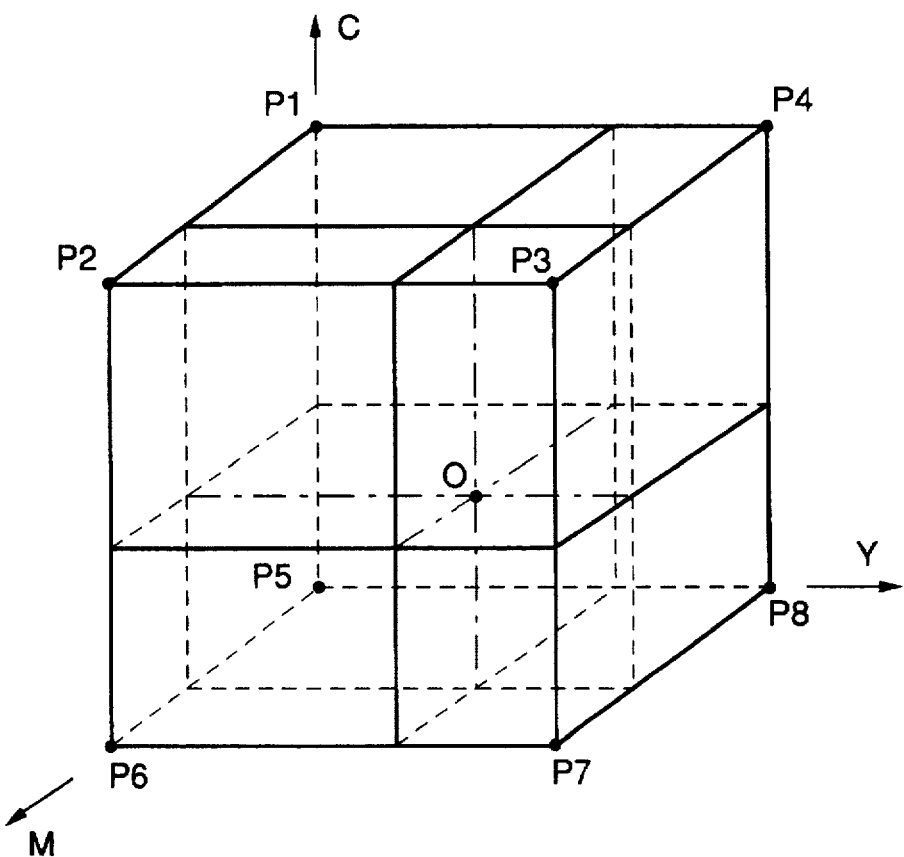
FIG. 3 illustrates the operation of the three-dimensional LUT 1b.

In the CMY space, a point corresponding to the upper nibbles $(C_U, M_U, Y_U)$ is called P5, a point corresponding to $(C_U, M_U, Y_U+1)$ is called P8, a point corresponding to $(C_U, M_U+1, Y_U)$ is called P6, a point corresponding to $(C_U, M_U+1, Y_U+1)$ is called P7, a point corresponding to $(C_U+1, M_U, Y_U)$ is called P1, a point corresponding to $(C_U+1, M_U, Y_U+1)$ is called P4, a point corresponding to $(C_U+1, M_U+1, Y_U)$ is called P2, and a point corresponding to $(C_U+1, M_U+1, Y_U+1)$ is called P3. FIG. 3 shows how these points are arranged in the CMY space. The solid boding having points P1–P8 as apices is called a basic solid body. Data (lightness signals) read out from the LUT lattice point data storing section 9 for points P1–P8 are called D1–D8, respectively.

Returning to FIG. 2, an interpolation calculating section 10 produces a lightness signal L* corresponding to CMY colors (full 8 bits) of input color signals based on lower 4 bits (hereinafter called lower nibbles $C_L$, $M_L$ and $Y_L$ of the input color signals and the data D1–D8. Details of this operation will be described with reference to FIG. 3. In FIG. 3, point O is a point in the CMY space which is specified by the CMY colors (full 8 bits) of the input color signals.

Referring to FIG. 3, positional relationships among the respective apices of the basic solid body and point O located therein are determined by the lower nibbles $C_L$, $M_L$ and $Y_L$. The basic solid body is divided into eight rectangular parallelepipeds by three planes that pass through point O and are parallel with the YM plane, MC plane, and CY plane, respectively. The volume of a rectangular parallelepiped having a segment connecting points O and P1 as a diagonal is calculated as V1, the volume of a rectangular parallelepiped having a segment connecting points O and P2 as a diagonal is calculated as V2, and the volume of a rectangular parallelepiped having a segment connecting points O and P3 as a diagonal is calculated as V3. Volumes V4–V8 of the remaining rectangular parallelepipeds are calculated in the similar manner.

After calculating the volumes V1–V8 in the above manner, the interpolation calculating section 10 finally determined a lightness signal L* according to Equation (2):

$$L^* = (D1 \cdot V7 + D2 \cdot V8 + D3 \cdot V5 + D4 \cdot V6 + D5 \cdot V3 + D6 \cdot V4 + D7 \cdot V1 + D8 \cdot V2)/V \qquad (2)$$

where V is a sum of the volumes V1–V8.

In the above manner, the three-dimensional LUT 1b outputs a lightness signal L* upon reception of CMY components of the input color signals from the selector 1a. The other three-dimensional LUTs 1c–1e operate in the same manner. And the three-dimensional LUT group color converters 2 and 3 are constructed in the same manner as the three-dimensional LUT group color converter 1. Thus, the three-dimensional LUT group color converters 1–3 output signals L*, a* and b*, respectively.

Next, the operation of the first embodiment will be described.

First, table data stored in the auxiliary storage device 6 are transferred to the respective LUTs, and CMYK data as input color signals are supplied to the input image storing device 41. When input color signals are read out from the input image storing device 41, the three-dimensional LUT switching device 4 produces a LUT selection signal based on a K-color component value. In each of the respective three-dimensional LUT group color converters 1–3, one of the three-dimensional LUTs is selected based on the LUT selection signal. The selected three-dimensional LUTs output signals L*, a* and b*, respectively, which are stored into the L*, a* and b* planes of the output image storing device 42.

As described above, this embodiment assures a certain level of color matching with the use of several 3-input/3- output LUT color converters. Compared to the case of using a 4-input/3-output LUT color converter, the memory capacity of the three-dimensional LUT group color converters 1–3 can be greatly reduced, which enables simplified color matching.

Embodiment 2

A second embodiment of the invention will be described with reference to FIG. 6. The components in FIG. 6 corresponding to those in the first embodiment are given the same reference numerals and descriptions therefor will be omitted.

Figure 6:
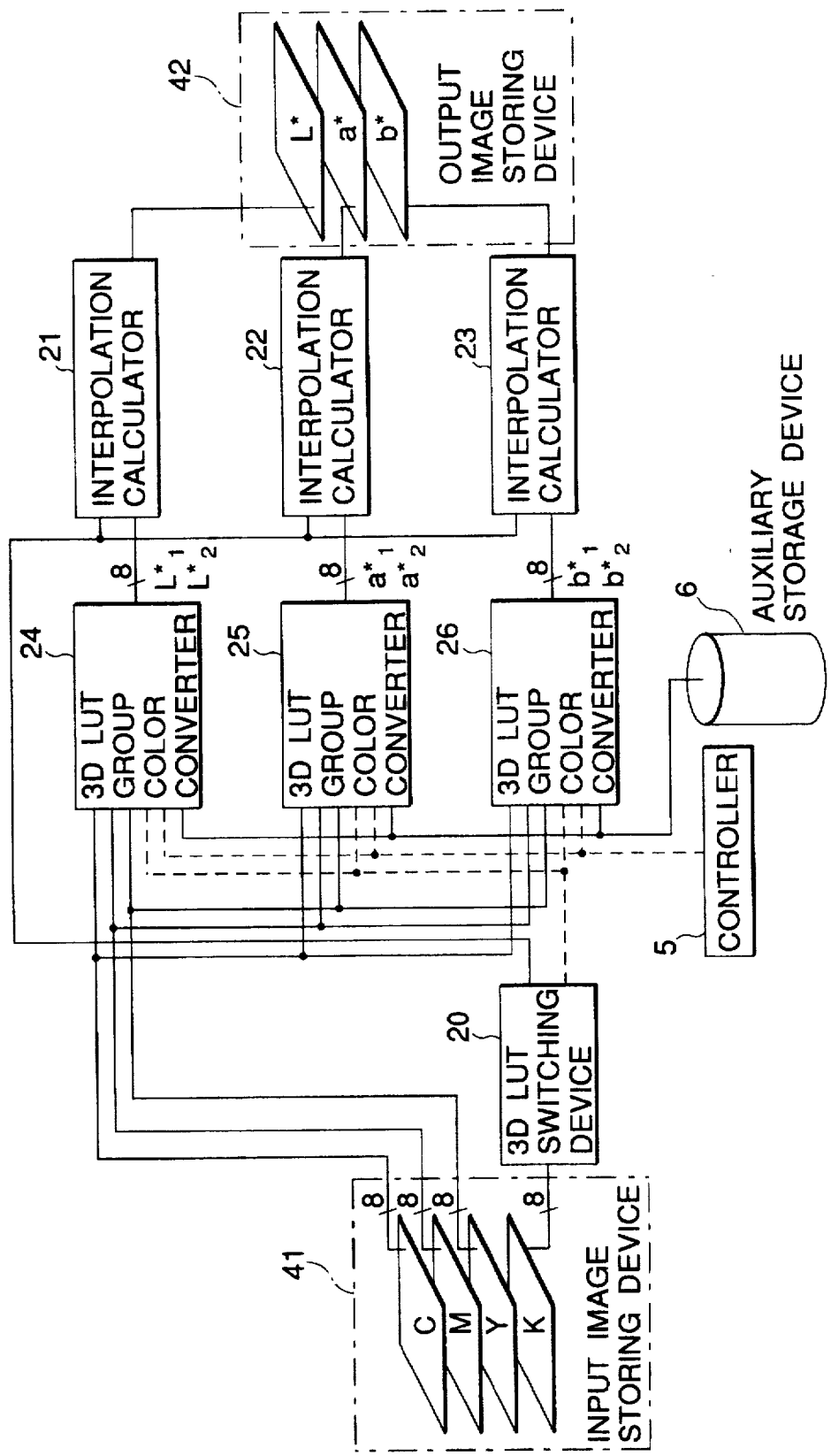
FIG. 6 is a block diagram showing a configuration of a second embodiment of the invention.
Figure 11:
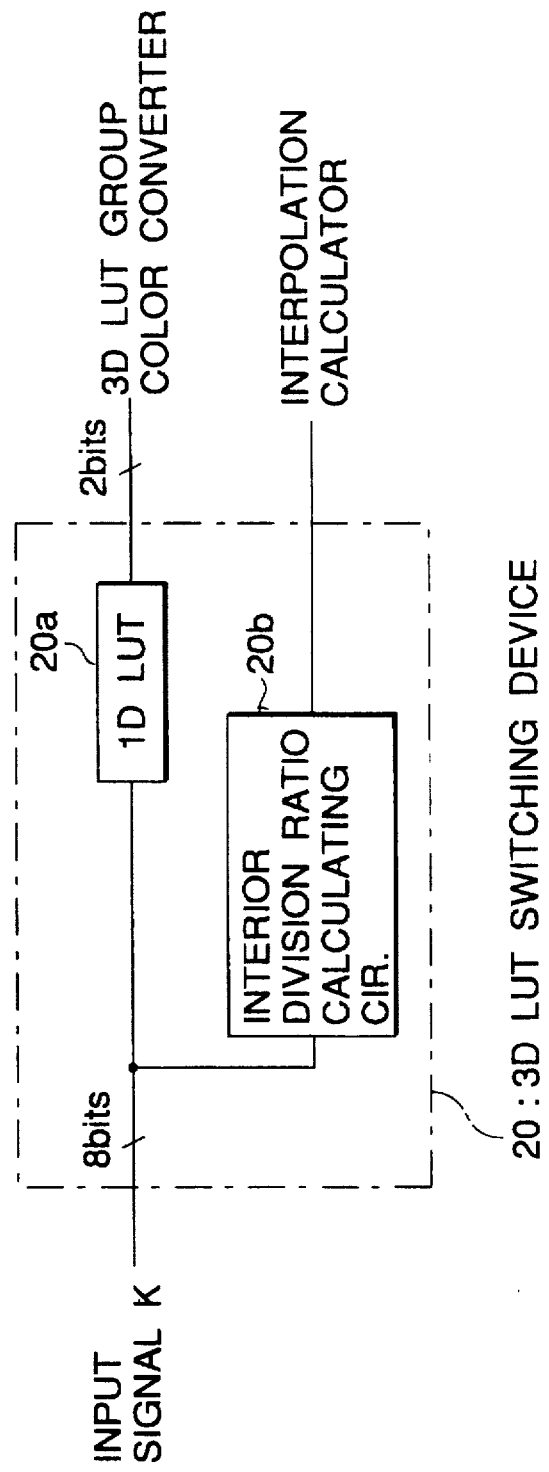
FIG. 11 is a block diagram showing a detailed configuration of a three-dimensional LUT switching device 20.

In FIG. 6, a three-dimensional LUT switching device 20 is provided in place of the three-dimensional LUT switching device 4 in FIG. 1. FIG. 11 shows a configuration of the three-dimensional LUT switching device 20. In FIG. 11, a one-dimensional LUT 20a, which is constructed in the same manner as the one-dimensional LUT 4a of the first embodiment, produces a LUT selection signal in response to a K-color component of input color signals. An interior division calculating circuit 20b calculates an interior division ratio of the K-color component in a section concerned (see FIG. 5).

Returning to FIG. 6, three-dimensional LUT group color converters 24–26 are constructed in the same manner as the three-dimensional LUT group color converters 1–3 of the first embodiment except that each of the three-dimensional LUT group color converters 24–26 has five three-dimensional LUTs in contrast to the fact that each of the three-dimensional LUT group color converters 1–3 has four three-dimensional LUTs 1b –1e (see FIG. 4). The three-dimensional LUTs provided in each of the three-dimensional LUT group color converters 24–26 stores lattice point data corresponding to K-color component intensity values "0," "21," "63," "125" and "255," respectively.

Each of the three-dimensional LUT group color converters 24–26 is provided with a selector corresponding to the selector 1a (see FIG. 4). The selector sequentially specifies three-dimensional LUTs corresponding to two K-color intensity values at the two ends of a section indicated by the LUT selection signal. For example, a description will be made of an operation of the three-dimensional LUT group color converter 24 in a case where the K-color intensity is "15." Since the intensity value "15" belongs to section 0 (see FIG. 5), the LUT selection signal is set at "00." In this case, two K-color intensity values at the two ends of section 0 are "0" and "21." Therefore, the selector of the three-dimensional LUT group color converter 24 sequentially accesses three-dimensional LUTs corresponding to "0" and "21," so that two lightness signals $L_1^*$ and $L_2^*$ are sequentially output.

Constructed in the same manner as the three-dimensional LUT group color converter 24, the three-dimensional LUT group color converters 25 and 26 output chromaticity signals $a_1^*$ and $a_2^*$, and $b_1^*$ and $b_2^*$, respectively. An interpolation calculator 21 produces a lightness signal L* based on the lightness signals $L_1^*$ and $L_2^*$ and the interior division ratio that is sent from the three-dimensional LUT switching device 20. That is, the lightness signal L* is expressed as $$L^* = L_1^* + (L_2^* - L_1^*) \cdot N \qquad (3)$$

where N is the interior division ratio.

The interpolation calculators 22 and 23 are constructed in the same manner as the interpolation calculator 21. Thus, the interpolation calculator 22 produces a chromaticity signal a* based on the chromaticity signals $a_1^*$ and $a_2^*$, and the interpolation calculator 23 produces a chromaticity signal b* based on the chromaticity signals $b_1^*$ and $b_2^*$.

Next, the operation of the second embodiment will be described.

First, as in the first embodiment, table data stored in the auxiliary storage device 6 are transferred to the respective LUTs, and CMYK data as input color signals are input to the input image storing device 41. When input color signals are read out from the input image storing device 41, a LUT selection signal and a signal indicating an interior division ratio are produced by the three-dimensional LUT switching device 20 based on a K-color component value.

In each of the three-dimensional LUT group color converters 24–26, two three-dimensional LUTs are sequentially selected based on the LUT selection signal. The selected LUTs output signals $L_1^*$, $a_1^*$, $b_1^*$, $L_2^*$, $a_2^*$ and $b_2^*$. The interpolation calculators 21–23 produce signals L*, a* and b* based on the above signals and the interior division ratio. The signals L*, a* and b* are stored, as output color signals, into L*, a* and b* planes of the output image storing device 42.

As described above, this embodiment can calculate output color signals L*, a* and b* at higher accuracy than the first embodiment because of the linear interpolation performed by the interpolation calculators 21–23. Further, the necessary memory capacity of the three-dimensional LUT group color converters 24–26 can be made much smaller than in the case of using a 4-input/3-output LUT color converter.

Embodiment 3

A third embodiment of the invention will be described with reference to FIG. 7. The components in FIG. 7 corresponding to those in the first and second embodiments are given the same reference numerals and descriptions therefor will be omitted.

Figure 7:
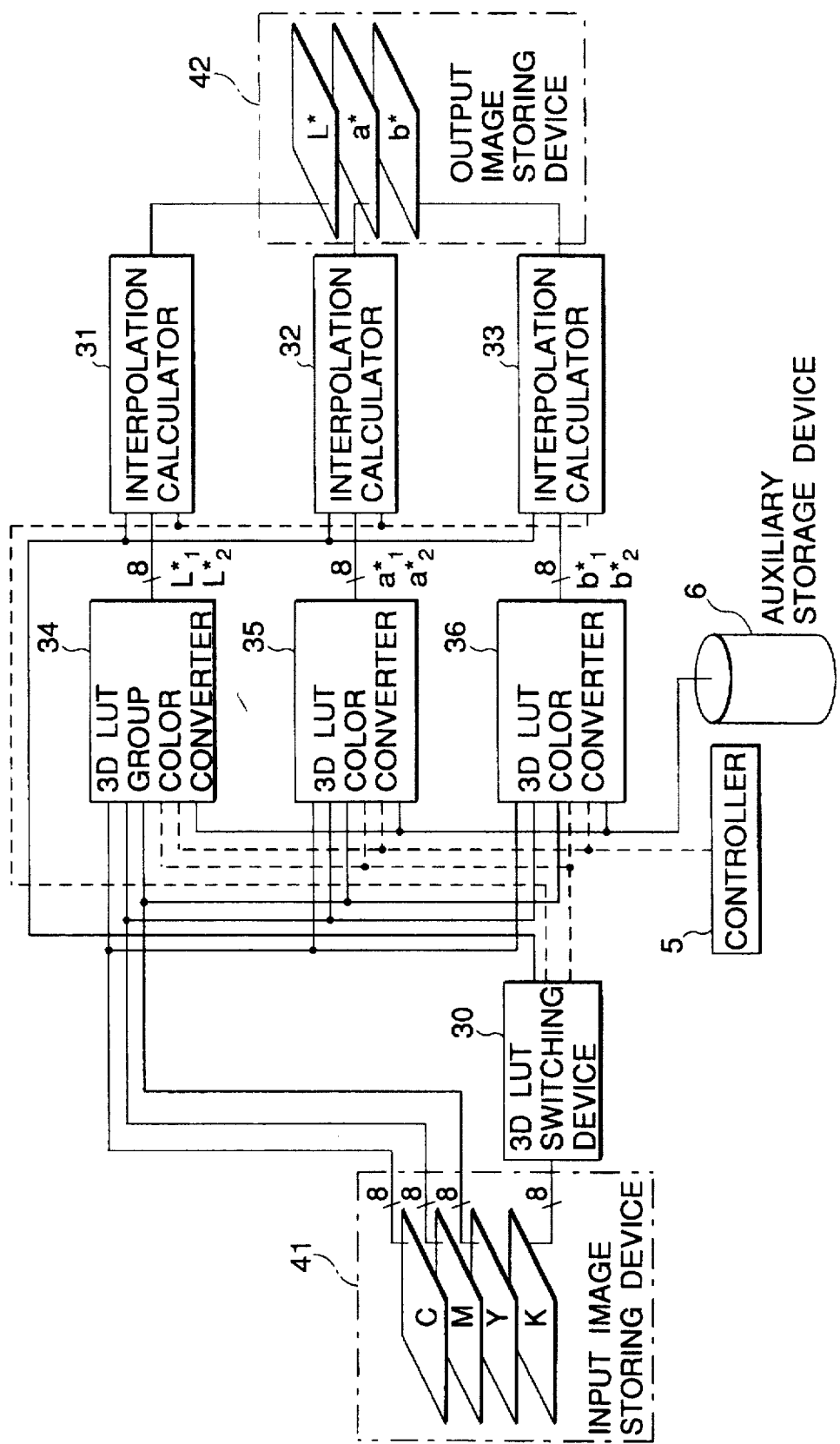
FIG. 7 is a block diagram showing a configuration of a third embodiment of the invention.
Figure 12:
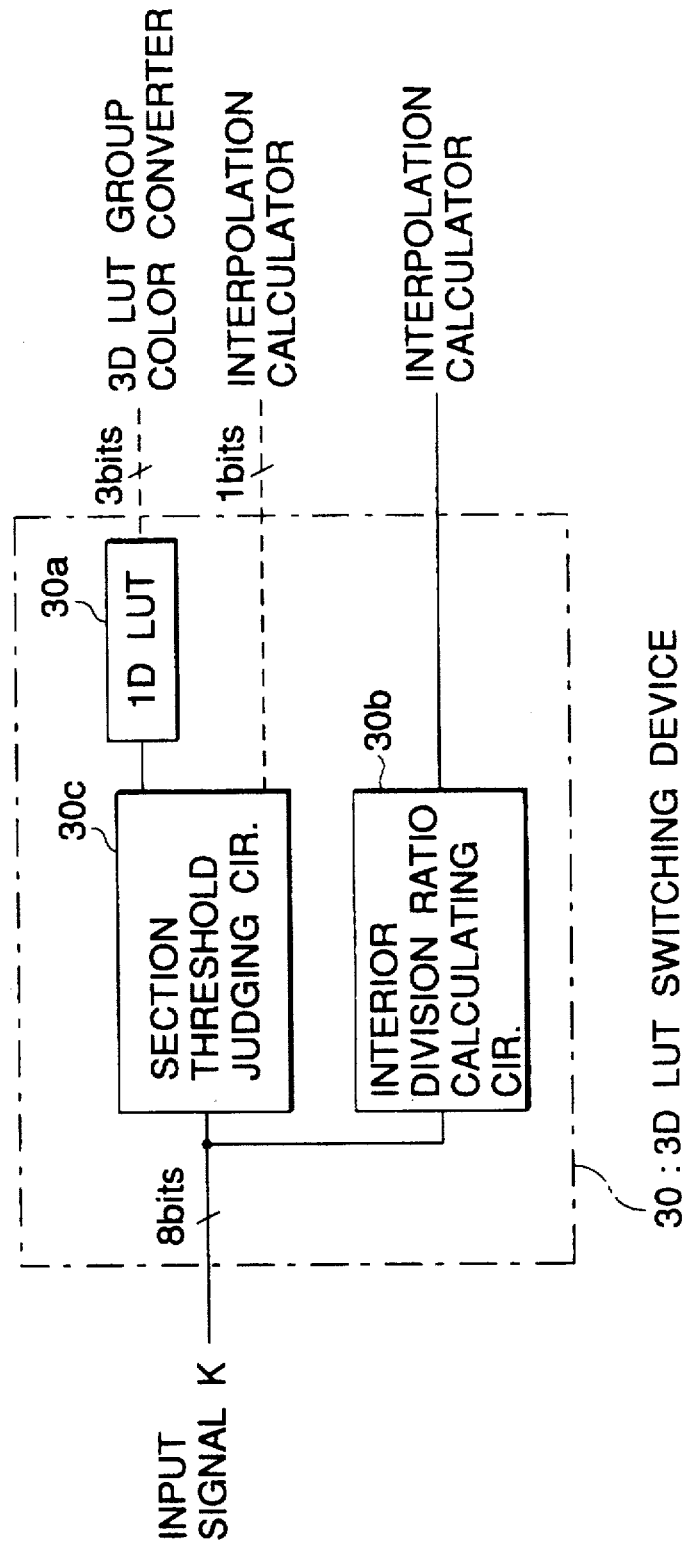
FIG. 12 is a block diagram showing a detailed configuration of a three-dimensional LUT switching device 30.

In FIG. 7, a three-dimensional LUT switching device 30 is provided in place of the three-dimensional LUT switching device 4 shown in FIG. 1. FIG. 12 shows a configuration of the three-dimensional LUT switching device 30. In FIG. 12, constructed in the same manner as the one-dimensional LUT 20a and the interior division ratio calculating circuit 20b of the second embodiment, a one-dimensional LUT 30a and an interior division ratio calculating circuit 30b output a LUT selection signal and an interior division ratio in response to a K-color component of input color signals. A section threshold judging circuit 30c outputs a threshold detection signal when the K-signal component intensity coincides with one of threshold values ("0," "21," "63," "125" and "255").

Returning to FIG. 7, three-dimensional LUT group color converters 34–36 are constructed in the same manner as the three-dimensional LUT group color converters 24–26 of the second embodiment. That is, each of the three-dimensional LUT group color converters 34–36 is provided with a selector, which sequentially selects three-dimensional LUTs corresponding to two K-color intensity values at the two ends of a section indicated by the LUT selection signal. However, when a threshold detection signal is output from the section threshold judging circuit 30c, the selector of this embodiment selects only one three-dimensional LUT corresponding to the threshold value. In this case, the three-dimensional LUT group color converters 34–36 output signals $L_1^*$, $a_1^*$ and $b_1^*$, but do not output signals $L_2^*$, $a_2^*$ and $b_2^*$.

Interpolation calculators 31–33 are constructed in the same manner as the interpolation calculators 21–23 of the second embodiment. That is, the interpolation calculators 31-3 produce output color signals L*, a* and b* by performing interpolating operations on the lightness signals $L_1^*$ and $L_2$, and the chromaticity signals $a_1^*$ and $a_2^*$, and $b_1^*$ and $b_2^*$. However, when a threshold detection signal is output from the section threshold judging circuit 30c, the interpolation calculators 31–33 of this embodiment output the signals $L_1^*$, $a_1^*$ and $b_1^*$ themselves as output color signals L*, a* and b*. That is, no interpolating operation is performed.

With the above configuration, output color signals L*, a* and b* that are of the same type as in the second embodiment are produced and stored into the output image storing device 42. However, in this embodiment, when a K-color component coincides with one of the threshold values, only one three-dimensional LUT is designated in each of the three-dimensional LUT group color converters 34–36, and the interpolation calculators 31–33 do not perform interpolating operations. Thus, this embodiment allows output color signals L*, a* and b* to be calculated at high speed with high accuracy.

Modifications

The invention is not limited to the above embodiments, but various modifications are possible as exemplified below.

(1) Although input color signals of CMYK are converted into output color signals of L*a*b* in the above embodiments, it goes without saying that the output color signals are not limited to L*a*b* signals but may be any signals including RGB signals, HSL signals, HSB signals, and L*u*v* signals. The number of quantization levels of input color signals is not limited to 256, but may be an arbitrary number. In particular, the configurations of the above embodiments can be used as they are if the output color signals are of three components (L*a*b*, L*u*v*, RGB, etc.).

Figure 8:
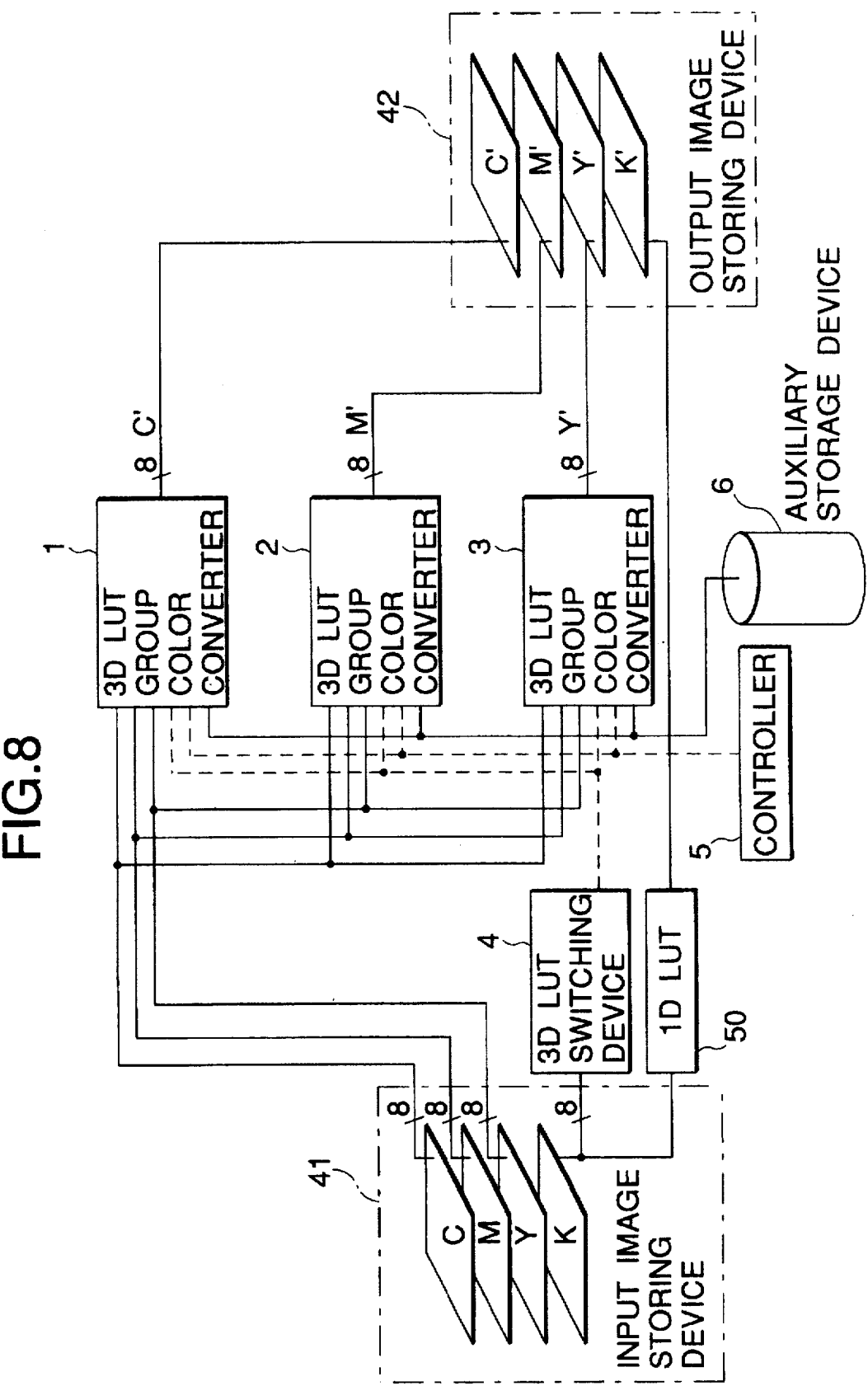
FIG. 8 is a block diagram showing a configuration of a modification of the first embodiment.
Figure 9:
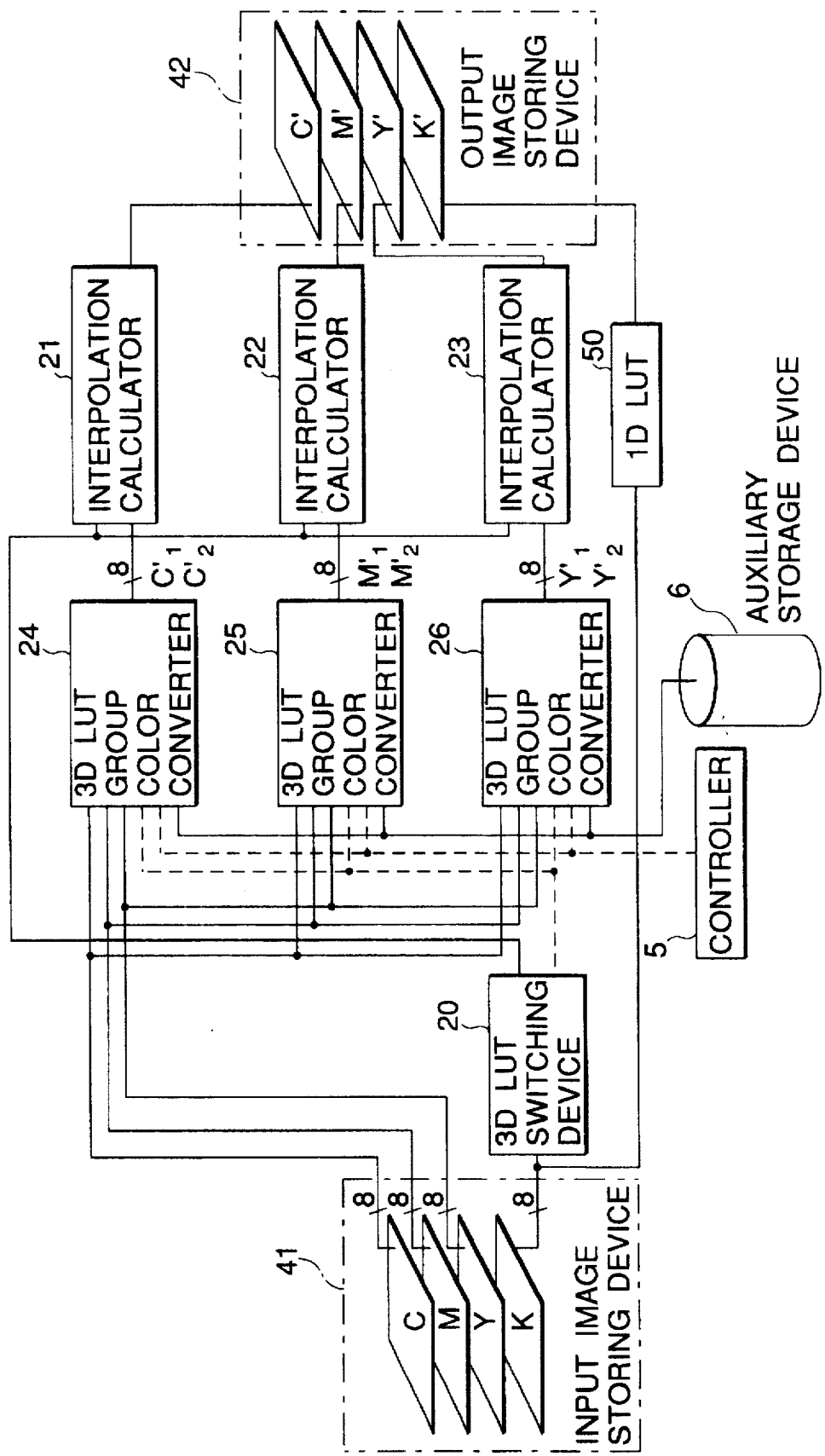
FIG. 9 is a block diagram showing a configuration of a modification of the second embodiment.
Figure 10:
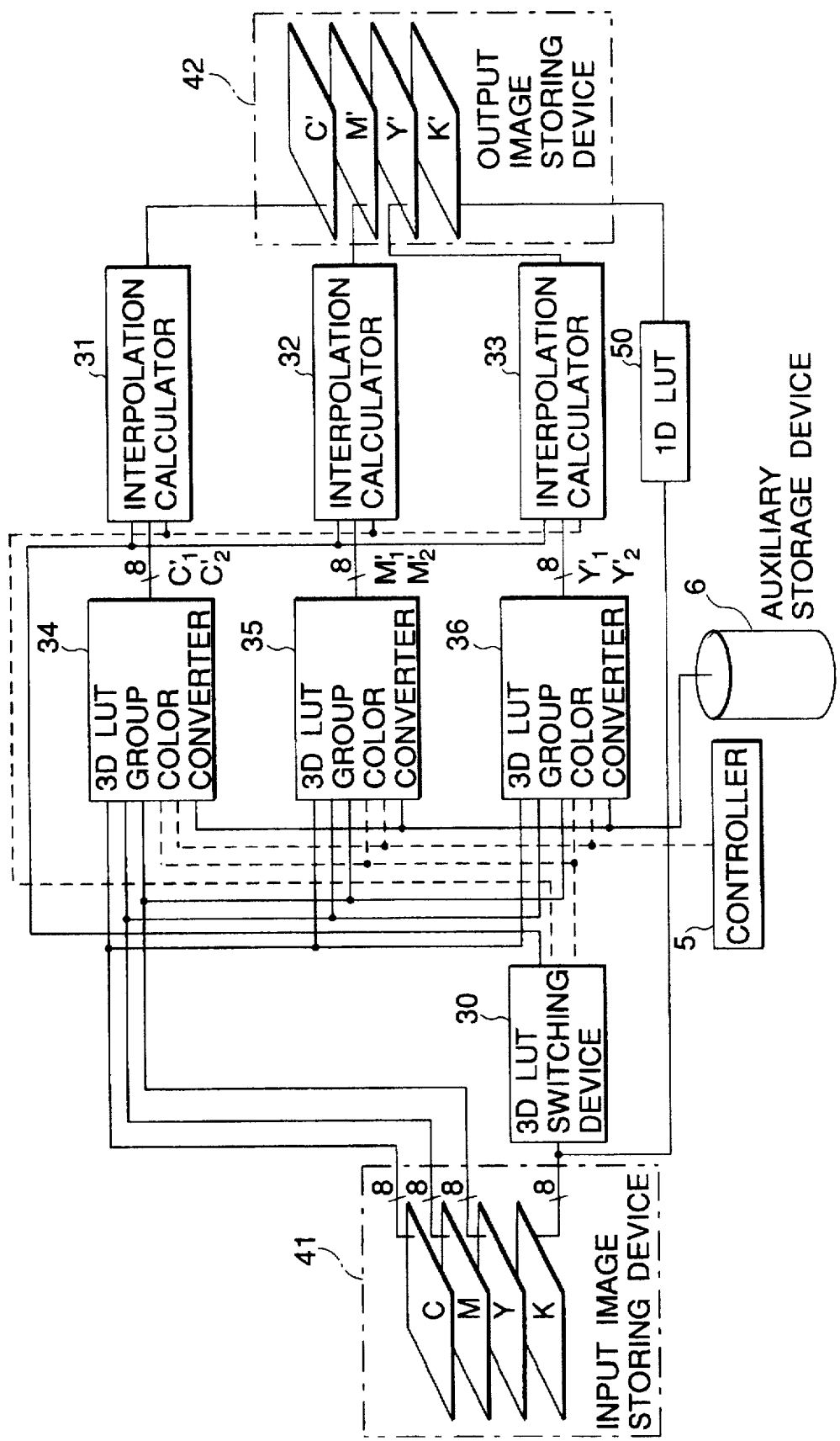
FIG. 10 is a block diagram showing a configuration of a modification of the third embodiment.

(2) Even if the output color signals are of four components, the configurations of the above embodiments can still be used by adding a three-dimensional LUT group color converter and a plane of the output image storing device 42. In particular, the output color signals are also of the CMYK format, it is highly probable that an apparatus can be realized without adding a three-dimensional LUT group color converter. FIGS. 8–10 show such examples in which the configurations of FIGS. 1, 6 and 7 are so modified as to produce output color signals of C', M', Y' and K'.

In FIGS. 8–10, circuits for producing output color signals C', M' and Y' are constructed in the same manner as the circuits for producing output color signals L*, a* and b* in the above embodiments. However, in these modifications, a one-dimensional LUT 50 is provided to define a gradation conversion characteristic between K-color components of input/output color signals. That is, an output color signal K' is obtained by supplying an input color signal K to the one-dimensional LUT 50. The reason why this configuration is employed is that when color signals of one CMYK format are converted into color signals of another CMKY format, there is a strong tendency that a K-color component of the latter signals is mainly determined by a K-color component of the former signals. In other words, even if CMY components of input color signals are disregarded, an output color signal K' can be obtained with sufficiently high accuracy.

(3) Although the solid body interpolation (see FIG. 3) is employed in the above embodiments, it goes without saying that the interpolation method is not limited thereto. For example, the Proceedings of the 24th Image Engineering Conference (1993, pp. 347–350) disclose triangular prism interpolation and oblique triangular prism interpolation. Further, other techniques such as tetrahedron interpolation is known. In short, the invention can employ any interpolation method.

(4) Although in the above embodiments the lattice point data stored in the LUT lattice point data storing section 9 are those corresponding to the upper nibbles $C_U$, $M_U$ and $Y_U$ of the input color signals, they are not limited to such data but may be data corresponding to some other number of bits which is smaller than the total data length (8 bits). Further, the lattice point data may be produced so as to correspond to different numbers of bits for the C, M and Y colors (for instance, 4 bits, 3 bits, and 3 bits, respectively). Further, the LUT lattice point data storing section 9 may store lattice point data corresponding to the total data length (8 bits), in which case naturally the interpolation calculating section 10 can be omitted.

(5) In the above embodiments, the near lattice point address generating section 8 sequentially supplies eight address signals to the LUT lattice point data storing section 9. The apparatus may be so modified that eight LUT lattice point data storing sections 9 are provided and eight address signals are supplied to the respective storing sections 9 at the same time. This makes it possible to further increase the speed of producing output color signals L*, a* and b*.

Principle of Operation-II

As an example of color matching, a case of converting input color signals of CMYK to output color signals of L*a*b* will be described. In this case, mapping from a four-dimensional space of CMYK to a three-dimensional space of L*a*b* is uniquely determined as follows:

$$(L^*,a^*,b^*)=F(C,M,Y,K) \tag{1}$$

Therefore, for arbitrary input color signals ($C_1$, $M_1$, $Y_1$, $K_1$), Equation (4) holds $$(L_1^*,a_1^*,b_1^*)=F(C_1,M_1,Y_1,K_1) \tag{4}$$

Another output color signals are defined as follows which are obtained from Equation (4) by forcibly making $K_1$ zero:

$$(L_2^*,a_2^*,b_2^*)=F(C_1,M_1,Y_1,0) \tag{5}$$

Still another output color signals are defined as follows which are obtained from Equation (4) by forcibly making $C_1$, $M_1$ and $Y_1$ zero:

$$(L_3^*,a_3^*,b_3^*)=F(0,0,0,K_1) \tag{6}$$

K colorants, i.e., colorants for black plate generation used in general color printers have almost no chromaticity components. Therefore, in such color printers, $a_3$ and $b_3$ in Equation (6) can be disregarded substantially, and Equation (6) can be rearranged as follows:

$$(L_3^*,0,0)=F(0,0,0,K_1) \tag{7}$$

($L_2^*$, $a_2^*$, $b_2^*$) in Equation (5) can be obtained by a 3-input/3-output converter and $L_3^*$ in Equation (7) can be obtained by a 1-input/1-output converter. Therefore, if ($L_1^*$, $a_1^*$, $b_1^*$) are expressed by simple functions of ($L_2^*$, $a_2^*$, $b_2^*$, $L_3^*$) that are obtained according to Equations (5) and (7), the 4-input color conversion can be substantially performed by a combination of a 3-input/3-output converter and a 1-input/1-output converter.

The inventors established the following hypotheses and have confirmed experimentally that the hypotheses hold.

(1) Consider a case of superimposing a K component on an arbitrary color ($L_X^*$, $a_X^*$, $b_X^*$) in the L*a*b* space. In this case, as the K value increases, the color converges to a certain low-lightness color (hereinafter called a converging color and expressed as a point ($L_0^*$, $a_0^*$, $b_0^*$) in the L*a*b* space). A color $(L_Y^*, a_Y^*, b_Y^*)$ obtained by superimposing a certain amount of K to the arbitrary color $(L_X^*, a_X^*, b_X^*)$ is expressed by Equation (8). In Equation (8), α is called a converging factor. That is, a locus in the L*a*b* space from the arbitrary color $(L_X^*, a_X^*, b_X^*)$ to the color $(L_0^*, a_0^*, b_0^*)$ is a straight line.

$$(L_Y^*, a_Y^*, b_Y^*) = \alpha(L_X^*, a_X^*, b_X^*) + (1-\alpha)(L_0^*, a_0^*, b_0^*) \quad (8)$$

(2) The converging factor α is determined only by $L_3^*$ that is obtained from K, i.e., is irrespective of the original color $(L_X^*, a_X^*, b_X^*)$. That is, the converging factor α is expressed by Equation (9). Experiments have shown that the converging factor α can be calculated with sufficiently high accuracy if a function G is quadratic.

$$\alpha = G(L_3) \quad (9)$$

Based on the above, the converging factor α is obtained by calculating $L_3^*$ according to Equation (9) and substituting resulting $L_3^*$ into Equation (9). Further, $(L_Y^*, a_Y^*, b_Y^*)$ are obtained by substituting $(L_2^*, a_2^*, b_2^*)$ that are calculated according to Equation (5) into $(L_X^*, a_X^*, b_X^*)$ of Equation (8), and serve as $(L_1^*, a_1^*, b_1^*)$. Equations (8) and (9) are together called "operation Ψ."

Embodiment 4

A fourth embodiment of the invention will be described with reference to FIG. 13.

Figure 13:
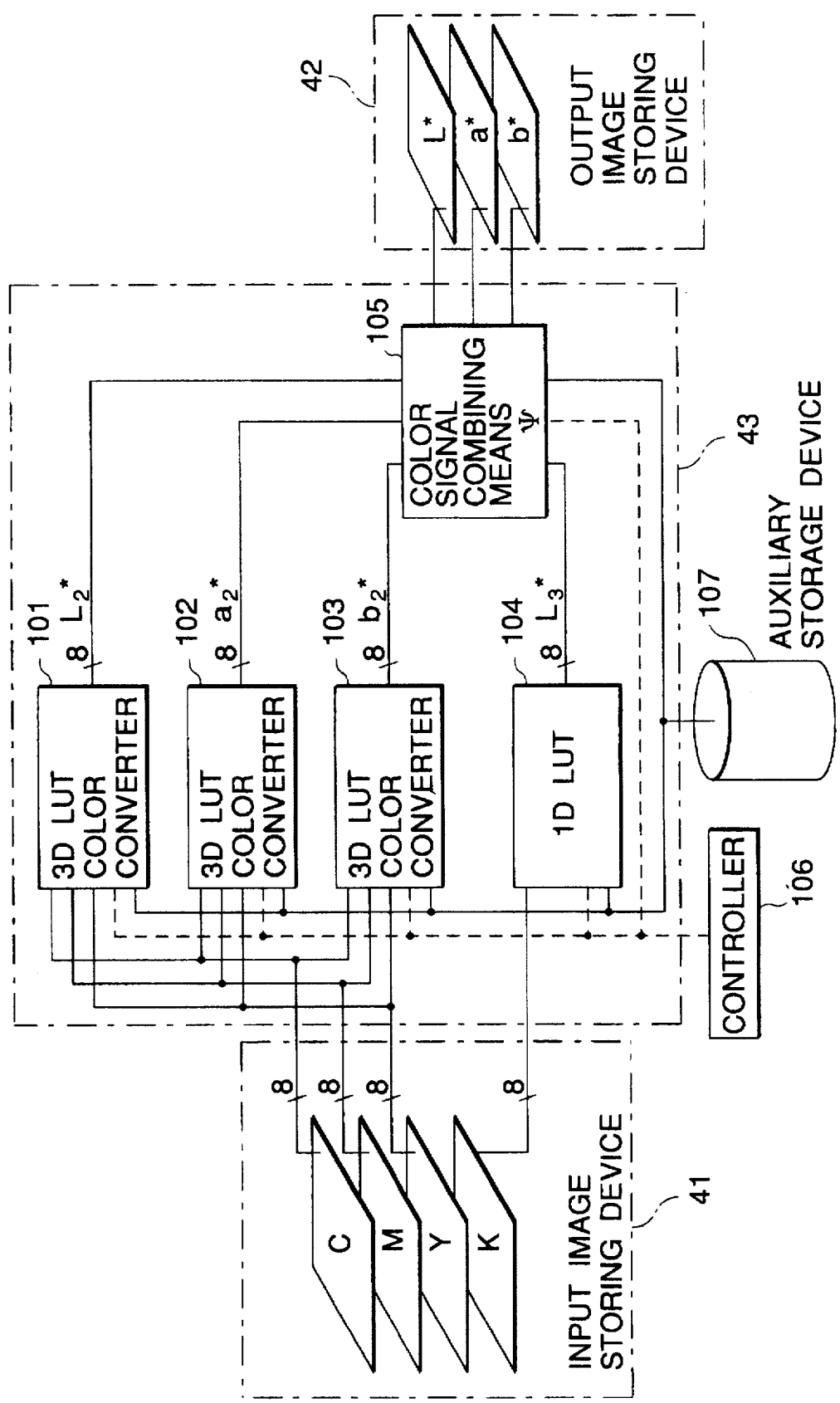
FIG. 13 is a block diagram showing a configuration of a fourth embodiment of the invention.

In FIG. 13, an input image storing device 41 stores input color signals. The input color signals are CMYK data in which the intensity of each color is expressed by a dot area ratio of 256 gradations (8 bits) with an assumption of a given printer. Three-dimensional LUT color converters 101–103 respectively produce output color signals $L_2^*$, $a_2^*$ and $b_2^*$ based on CMY components of the input color signals. That is, the three-dimensional LUT color converters 101–103 output left-side values of Equation (5).

A one-dimensional LUT 104 produces a lightness signal $L_3^*$, i.e., a left-side value of Equation (7) based on a K-color component of the input color signals. A color signal combining means 105 produces output color signals $(L_1^*, a_1^*, b_1^*)$ based on the signals $L_2^*$, $a_2^*$, $b_2^*$ and $L_3^*$ obtained above. Table data to be stored into the LUTs 101–104 are originally stored in an auxiliary storage device 107. The table data are transferred to the LUTs 101–104 under the control of a controller 106. An output image storing device 42 stores output color signals of the output color signals $(L_1^*, a_1^*, b_1^*)$ of the color signal combining means 105. The output image storing device 42 consists of three planes (L* plane, a* plane, and b* plane) that are independently readable and writable. Respective components of the output color signals are stored in those planes.

The three-dimensional LUT color converter 101–103 are constructed in the same manner as the three-dimensional LUT 1b (which outputs L*), which was described above with reference to FIGS. 2 and 3. Thus, the three-dimensional LUT color converters 101–103 produce output signals $L_2^*$, $a_2^*$ and $b_2^*$, where $$L_2^* = (D1 \cdot V7 + D2 \cdot V8 + D3 \cdot V5 + D4 \cdot V6 + D5 \cdot V3 + D6 \cdot V4 + D7 \cdot V1 + D8 \cdot V2)/V \quad (10)$$

Figure 14:
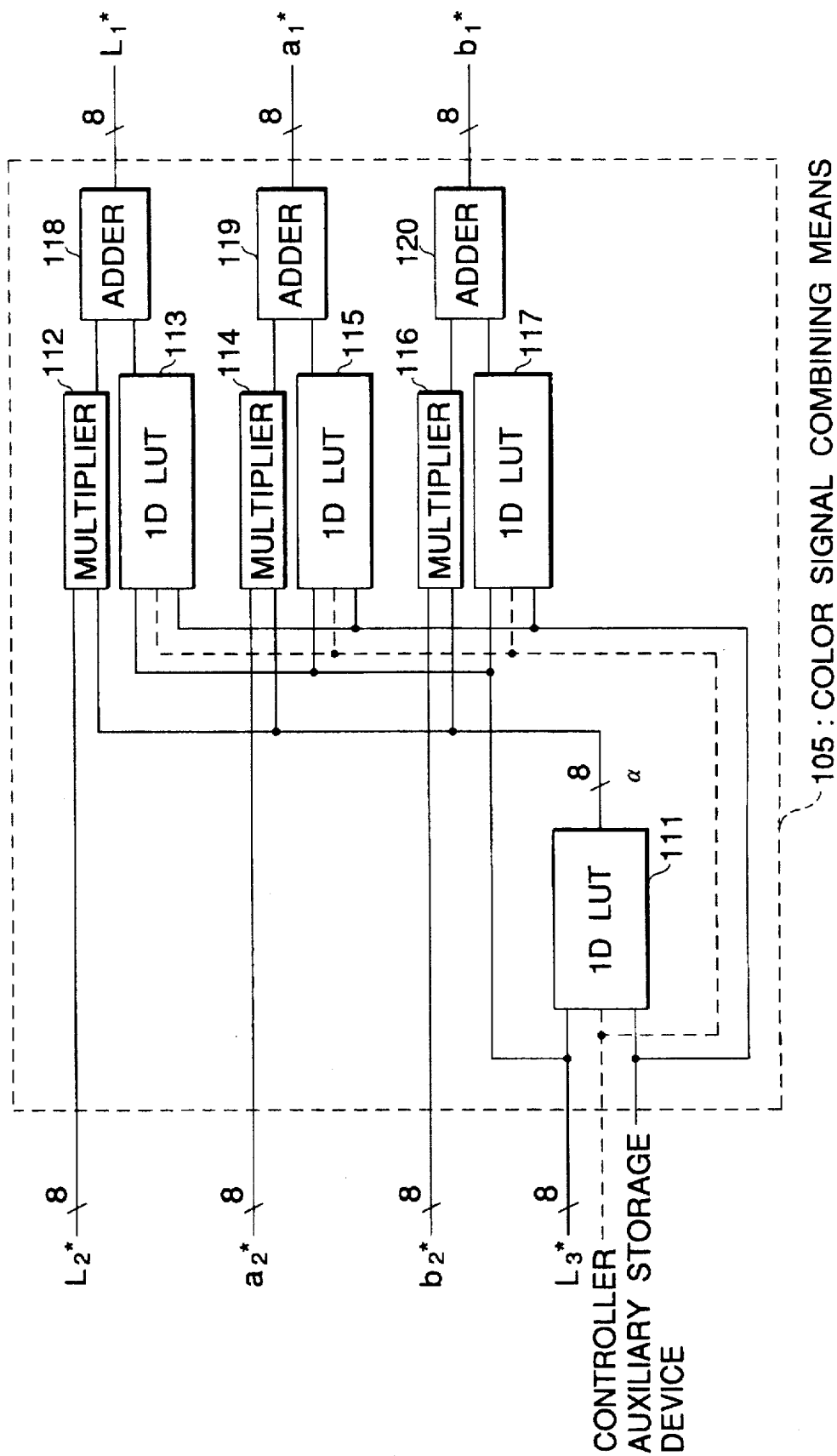
FIG. 14 is a block diagram showing a detailed configuration of a color signal combining means 105.

Next, a detailed configuration of the color signal combining means 105 will be described with reference to FIG. 14. In FIG. 14, a one-dimensional LUT 111 produces a converging factor α (see Equation (9)) upon reception of a lightness signal $L_3^*$. The contents of the one-dimensional LUT 111 depends on the kind of colorant used in a printer or the like, and may be determined in advance by an experiment, for instance. One-dimensional LUTs 113, 115 and 117 store values of the second term of the right side of Equation (8), i.e., $(1-\alpha)L_0^*$, $(1-\alpha)a_0^*$, and $(1-\alpha)b_0^*$, respectively, for each value of the converging factor α.

Multipliers 112, 114 and 116 multiplies together the converging factor α that is supplied from the one-dimensional LUT 111 and signals $L_2^*$, $a_2^*$ and $b_2^*$ that are supplied from the three-dimensional color converters 101–103, respectively. An adder 118 adds together an output signal of the multiplier 112 and an output signal of the one-dimensional LUT 113. Similarly, an adder 119 adds together an output signal of the multiplier 114 and an output signal of the one-dimensional LUT 115, and an adder 120 adds together an output signal of the multiplier 116 and an output signal of the one-dimensional LUT 117. As a result, the adders 118–120 outputs left-side values $(L_Y^*, a_Y^*, b_Y^*)$ of Equation (8), i.e., $(L_1^*, a_1^*, b_1^*)$.

Next, the operation of this embodiment will be described. First, table data stored in the auxiliary storage device 104 are transferred to the LUTs, and CMYK data as input color signals are supplied to the input image storing device 41. When input color signals are read out from the input image storing device 41, output signals $L_2^*$, $a_2^*$, $b_2^*$ and $L_3^*$ are produced through the three-dimensional LUT color converters 101–103 and the one-dimensional LUT 104, and then converted into output color signals $L_1^*$, $a_1^*$ and $b_1^*$ by the color signal combining means 105. The output color signals $L_1^*$, $a_1^*$ and $b_1^*$ are stored into the output image storing device 42.

As described above, this embodiment enables high-precision color matching that is equivalent to that of a 4-input/3-output LUT color converter merely by adding small circuits (one-dimensional LUT 104 and color signal combining means 105) to a 3-input/3-output LUT color converter (converters 101–103). Compared to the case of using a 4-input/3-output LUT color converter, the memory capacity of the three-dimensional LUT color converters 101–103 can be greatly reduced, which enables high-precision color matching to be performed in a simplified manner. In addition, since each of the three-dimensional LUT color converter 101–103 is constituted of the LUT lattice point data storing section and the interpolation calculating section, the necessary memory capacity of the color converters 101–103 is reduced, to further simplify the color matching.

Embodiment 5

A fifth embodiment of the invention will be described with reference to FIG. 15. The components in FIG. 15 corresponding to those in the fourth embodiment are given the same reference numerals and descriptions therefor will be omitted.

Figure 15:
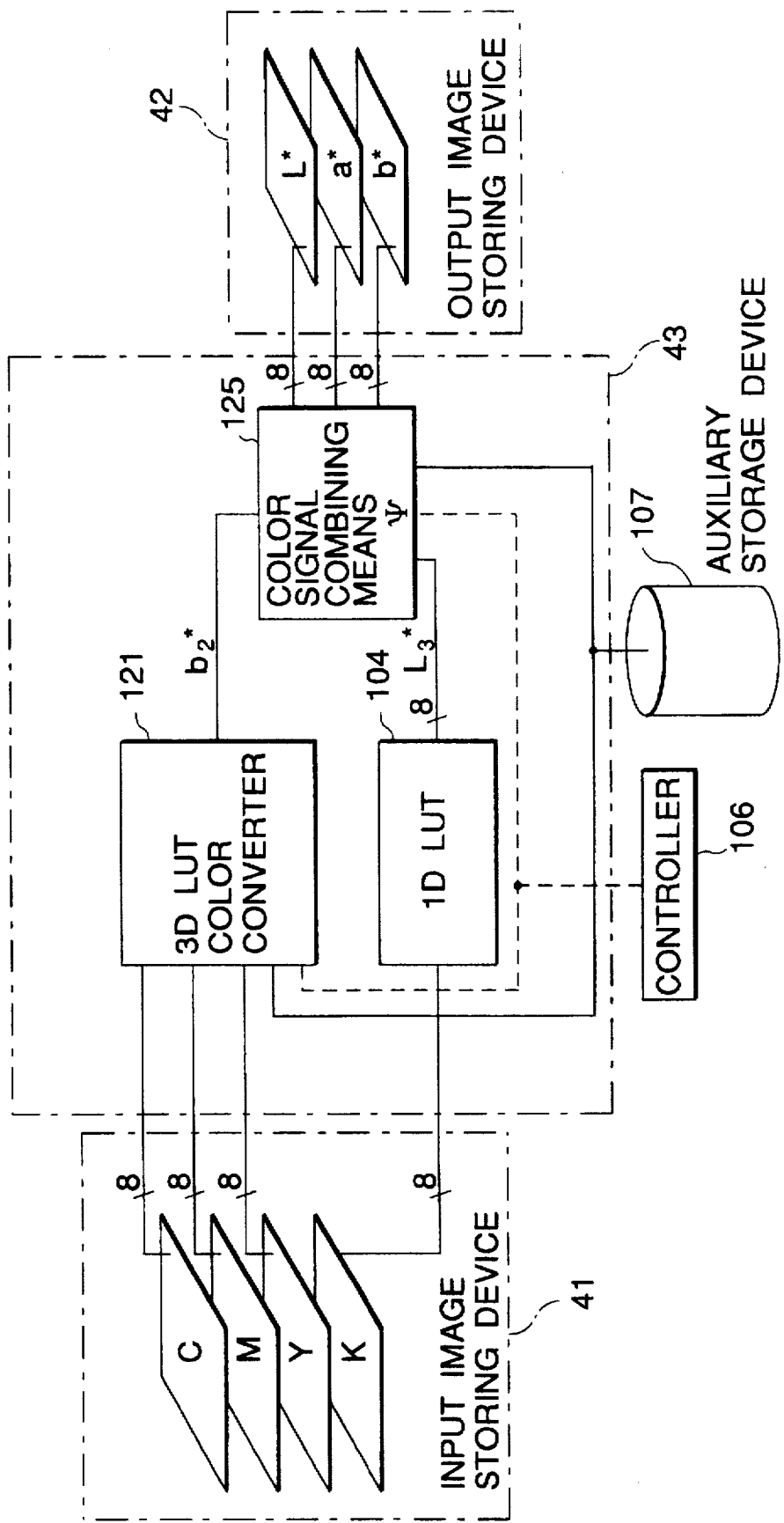
FIG. 15 is a block diagram showing a configuration of a fifth embodiment of the invention.

In FIG. 15, a three-dimensional LUT color converter 121 is constructed in the same manner as the three-dimensional LUT color converter 101 shown in FIG. 13 except that the contents of the LUT lattice point data storing section (see FIG. 2) are rewritten properly under the control of the controller 106.

Details of a color signal combining means 25 will be described with reference to FIG. 16.

Figure 16:
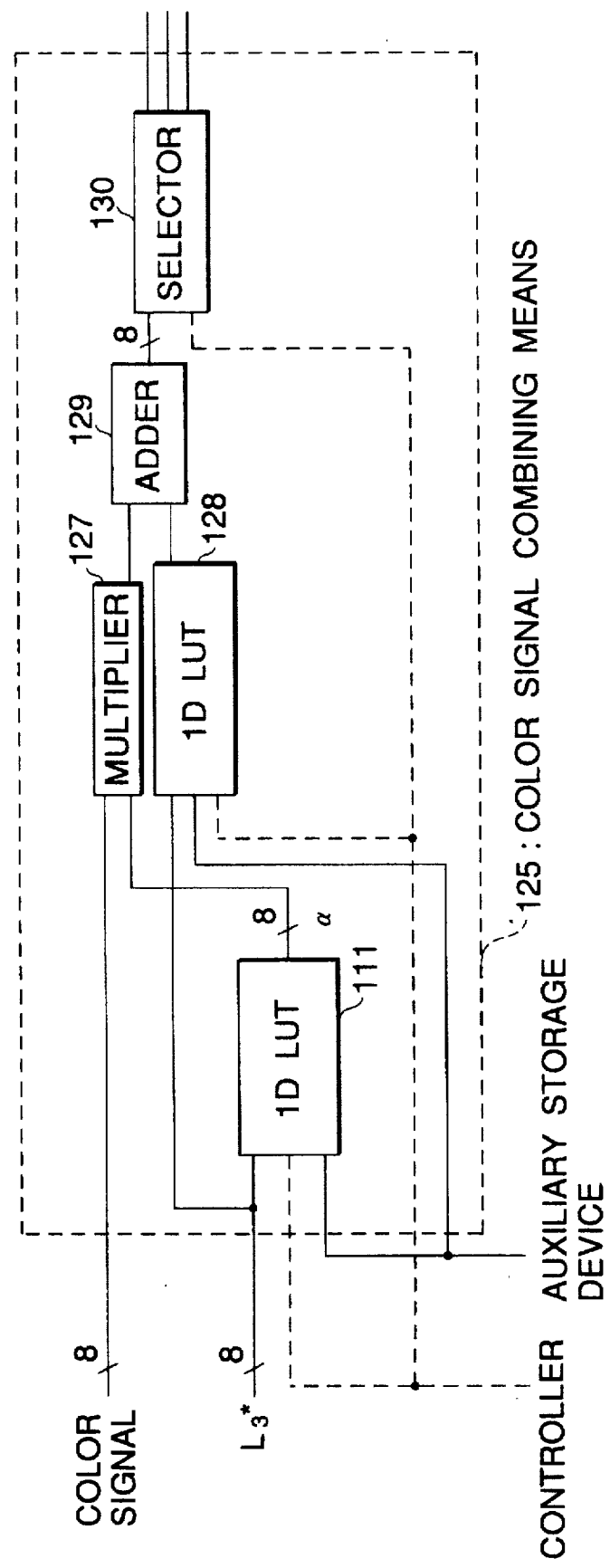
FIG. 16 is a block diagram showing a detailed configuration of a color signal combining means 125.

In FIG. 16, a multiplier 127, a one-dimensional LUT 128, and an adder 129 are respectively constructed in the same manner as the multiplier 112, the one-dimensional LUT 113, and the adder 118 shown in FIG. 14, with an exception that the contents of the one-dimensional LUT 113 are rewritten properly under the control of the controller 106. A selector 130 properly changes the plane into which an output color signal is stored by the controller 106.

Next, the operation of this embodiment will be described.

First, as in the fourth embodiment, table data are read out from the auxiliary storage device 107 and written to the LUTs 104 and 111, and CMYK data as input color signals are input to the input image storing device 41. Then, data corresponding to those of the LUT lattice point data storing section of the three-dimensional LUT color converter 101 of the fourth embodiment are written to the LUT lattice point data storing section of the three-dimensional LUT color converter 121. And data corresponding to those of the one-dimensional LUT 113 of the fourth embodiment are written to the one-dimensional LUT 128. The selector 130 is so set as to select the L* plane as the write destination plane.

When input color signals are read out from the input image storing device 41, signals $L_2^*$ and $L_3^*$ are produced through the three-dimensional LUT color converter 121 and the one-dimensional LUT 104, and then converted into an output color signal $L_1^*$ by the color signal combining means 125. The output color signal $L_1^*$ is stored into the lightness signal plane, i.e., the L* plane of the output image storing device 42.

When the storage of the output color signal into the L* plane has been completed, the contents of the LUT lattice point data storing section of the three-dimensional LUT color converter 121 are written to data corresponding to those of the LUT lattice point data storing section of the three-dimensional LUT color converter 102 of the fourth embodiment. And the contents of the one-dimensional LUT 128 are written to data corresponding to those of the one-dimensional LUT 115 of the fourth embodiment. The selector 130 is so set as to select the a* plane as the write destination plane. When input color signals are read out from the input image storing device 41, signals $a_2^*$ and $L_3^*$ are produced through the three-dimensional LUT color converter 121 and the one-dimensional LUT 104, and then converted into an output color signal $a_1^*$ by the color signal combining means 125. The output color signal $a_1^*$ is stored into the a* plane of the output image storing device 42.

When the storage of the output color signal into the a* plane has been completed, the contents of the LUT lattice point data storing section of the three-dimensional LUT color converter 121 are written to data corresponding to those of the LUT lattice point data storing section of the three-dimensional LUT color converter 103 of the fourth embodiment. And the contents of the one-dimensional LUT 128 are written to data corresponding to those of the one-dimensional LUT 117 of the fourth embodiment. The selector 130 is so set as to select the b* plane as the write destination plane. When input color signals are read out from the input image storing device 41, signals $b_2^*$ and $L_3^*$ are produced through the three-dimensional LUT color converter 121 and the one-dimensional LUT 104, and then converted into an output color signal $b_1^*$ by the color signal combining means 125. The output color signal $b_1^*$ is stored into the b* plane of the output image storing device 42.

As described above, according to this embodiment, output color signals are sequentially stored into the L*, a* and b* planes of the output image storing device 42 while the contents of the respective tables are written properly. Since this embodiment can reduce the necessary memory capacity from the case of the fourth embodiment, it enables high-precision color matching by a further simplified configuration.

Modifications

The second aspect of the invention is not limited to the fourth and fifth embodiments, but various modifications are possible as exemplified below.

(1) Although input color signals of CMYK are converted into output color signals of L*a*b* in the above embodiments, it goes without saying that the output color signals are not limited to L*a*b* signals but may be any luminance/chrominance separation type signals including HSL signals, HSB signals, and L*u*v* signals. The number of quantization levels of input color signals is not limited to 256, but may be an arbitrary number.

(2) Although the solid body interpolation (see FIG. 3) is employed in the above embodiments, it goes without saying that the interpolation method is not limited thereto. For example, the Proceedings of the 24th Image Engineering Conference (1993, pp. 347–350) disclose triangular prism interpolation and oblique triangular prism interpolation. Further, other techniques such as tetrahedron interpolation is known. In short, the invention can employ any interpolation method.

(3) Although in the above embodiments the lattice point data stored in the LUT lattice point data storing section are those corresponding to the upper nibbles $C_U$, $M_U$ and $Y_U$ of the input color signals, they are not limited to such data but may be data corresponding to some other number of bits which is smaller than the total data length (8 bits). Further, the lattice point data may be produced so as to correspond to different numbers of bits for the C, M and Y colors (for instance, 4 bits, 3 bits, and 3 bits, respectively). Further, the LUT lattice point data storing section may store lattice point data corresponding to the total data length (8 bits), in which case naturally the interpolation calculating section can be omitted.

(4) In the above embodiments, the one-dimensional LUT 104 calculates a lightness signal $L_3^*$ based on a K-color component of input color signals, and the one-dimensional LUT 1 calculates the converging factor α based on the thus-calculated lightness signal $L_3^*$. The one-dimensional LUTs 104 and 111 may be unified to directly calculate the converging factor α based on a K-color component of input color signals. It goes without saying that the converging factor α may be calculated by using, for instance, an equation that defines a relationship between the K-color component of the input color signals and the converging factor α. In particular, where the converging factor α can be obtained with sufficiently high accuracy by a simple operation using a linear equation, a quadratic equation, or the like, it is preferable to calculate the converging factor α by using a combination of adders, multipliers, and other devices.

Figure 17:
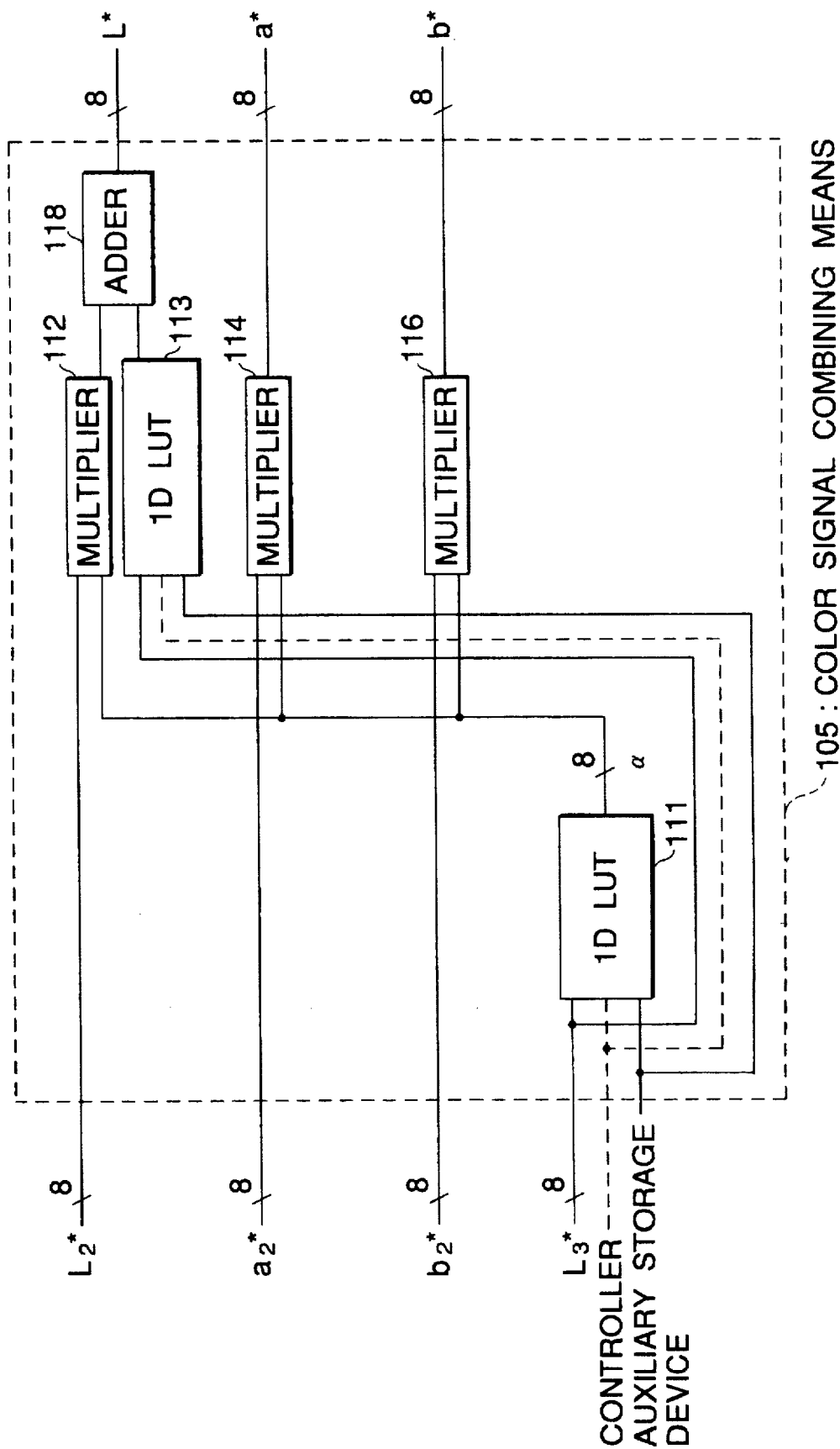
FIG. 17 is a block diagram showing a modification of the fourth embodiment.

(5) In the case of certain kinds of K colorants, CMY colors can be hidden almost completely when a K color is superimposed on CMY colors. In such a case, a converging color can be regarded as being located on the L* axis in the L*a*b* space. Since both a* and b* components are zero, a converging color ($L_0^*$, $a_0$, $b_0$) becomes ($L_0$, 0, 0). In this case, as for the a* and b* components, information indicating a distance between a converging color and the origin (0, 0, 0) is not necessary. Therefore, the one-dimensional LUTs 115 and 117 can be eliminated to simplify the apparatus as shown in FIG. 17.

(6) In the above embodiments, the operation Ψ is realized by the several kinds of look-up tables provided in the color signal combining means 105. It goes without saying that instead of using look-up tables, output color signals may be produced according to, for instance, equations that define the operation Ψ. That is, since the operation Ψ is to calculate ($L_1^*$, $a_1^*$, $b_1^*$) simply by performing an interior division operation on ($L_2^*$, $a_2^*$, $b_2^*$, $L_3^*$), selection may be made between the look-up table type implementation and the operation circuit type implementation by considering a balance among the accuracy required for the operation, the allocatable memory capacity, the required operation time, and other factors.

(7) In the fifth embodiment, the contents of the LUT lattice point data storing section are written to data for the next plane after storage of an output color signal into one plane is completed. Alternatively, the contents of the LUT lattice point data storing section may be renewed sequentially on a line-by-line basis to complete storage into the L*, a* and b* planes approximately at the same time.

What is claimed is:

1. A color image processing apparatus for converting input color signals of a first color system consisting of intensities of cyan, magenta, yellow, and black into color signals of a given, second color system, comprising:

first converting means provided in association with a first intensity of black, for producing first color signals from the intensities of cyan, magenta, and yellow of the input color signals;

second converting means provided in association with a second intensity of black, for producing second color signals from the intensities of cyan, magenta, and yellow of the input color signals; and selecting means for selecting one of the first and second converting means in accordance with the intensity of black of the input color signals.

2. A color image processing apparatus for converting input color signals of a first color system consisting of intensities of cyan, magenta, yellow, and black into color signals of a given, second color system, comprising:

first converting means provided in association with a first intensity of black, for producing first color signals from the intensities of cyan, magenta, and yellow of the input color signals;

second converting means provided in association with a second intensity of black, for producing second color signals from the intensities of cyan, magenta, and yellow of the input color signals; and interior division calculating means for calculating an interior division ratio between the first intensity of black and the second intensity of black based on an intensity of black of the input color signals; and interpolating means for performing an interpolating operation on the first color signals and the second color signals in accordance with the interior division ratio calculated by the interior division calculating means.

3. The color image processing apparatus according to claim 2, further comprising judging means for judging whether the intensity of black of the input color signals coincides with the first intensity of black or the second intensity of black, wherein the apparatus outputs the first color signals when the intensity of black of the input color signals coincides with the first intensity of black, outputs the second color signals when the intensity of black of the input color signals coincides with the second intensity of black, and outputs results of the interpolating operation of the interpolating means when the intensity of black of the input color signals coincides neither of the first and second intensity of black.

4. A color image processing apparatus for converting input color signals of a first color system consisting of intensities of cyan, magenta, yellow and black into color signals of a given, second color system, comprising:

converting means for producing first color signals from the intensities of cyan, magenta and yellow of the input color signals;

correction value producing means for producing a correction value based on the intensity of black of the input color signals;

color signal correcting means for producing second color signals of the second color system based on the first color signals produced by the converting means and the correction value produced by the correction value producing means;

lattice point data storing means for storing discreet lattice point data to be used for producing the first color signals; and interpolating means for interpolating plural ones of the lattice point data stored in the lattice point data storing means to produce the first color signals, wherein the second color signals produced by the color signal correcting means consist of a plurality of components, the lattice point data storing means has a memory capacity that enables storage of lattice point data for one of the components, the apparatus further comprises transfer means for sequentially transferring, to the lattice point data storing means, lattice point data for the respective components, and the converting means sequentially produces the respective components of the second color signals by using the lattice point data stored in the lattice point data storing means.

5. A color matching processing method for converting input color signals of a first color system consisting of intensities of cyan, magenta, yellow, and black into color signals of a given, second color system, comprising:

a first converting step in association with a first intensity of black, of producing first color signals from the intensities of cyan, magenta, and yellow of the input color signals;

a second converting step in association with a second intensity of black, of producing second color signals from the intensities of cyan, magenta, and yellow of the input color signals; and the step of selecting one of the first and second converting steps in accordance with the intensity of black of the input color signals.

6. A color image processing apparatus for converting input color signals of a first color system consisting of intensities of cyan, magenta, yellow, and black into color signals of a given, second color system, comprising:

converting means for producing first color signals from the intensities of cyan, magenta, and yellow of the input color signals;

correction value producing means for producing a correction value based on the intensity of black of the input color signals; and color signal correcting means for producing second color signals of the second color system based on the first color signals produced by the converting means and the correction value produced by the correction value producing means.

7. The color image processing apparatus according to claim 6, wherein the converting means comprises:

lattice point data storing means for storing discrete lattice point data to be used for producing the first color signals; and interpolating means for producing the first color signals by performing an interpolating operation on plural ones of the lattice point data stored in the lattice point data storing means.

8. The color image processing apparatus of claim 6, wherein said correction value is produced using a quadratic equation.

9. The color image processing apparatus of claim 6, wherein said correction value is produced using the equation $\alpha=G(L_3)$ wherein $\alpha$ is a converging factor, $L_3$ is the intensity of black of the input color signals and $G(L_3)$ is a function of the intensity of black of the input color signals.

10. The color image processing apparatus of claim 9, wherein the function $G(L_3)$ is a higher order function.

11. The color image processing apparatus of claim 9, wherein the function $G(L_3)$ has an order of at least 2.

12. A color matching processing method for converting input color signals of a first color system consisting of intensities of cyan, magenta, yellow, and black into color signals of a given, second color system, comprising the steps of:

a converting step of producing first color signals from the intensities of cyan, magenta, and yellow of the input color signals;

a correction value producing step of producing a correction value based on the intensity of black of the input color signals; and a color signal correcting step of producing second color signals of the second color system based on the first color signals produced by the converting step and the correction value produced by the correction value producing step.

13. The color matching processing method of claim 12, wherein said correction value is produced using a quadratic equation.

14. The color matching processing method of claim 12, wherein said correction value is produced using the equation $\alpha=G(L_3)$, wherein $\alpha$ is a converging factor, $L_3$ is the intensity of black of the input color signals and $G(L_3)$ is a function of the intensity of black of the input color signals.

15. The color matching processing method of claim 14, wherein the function $G(L_3)$ is a higher order function.

16. The color matching processing method of claim 14, wherein the function $G(L_3)$ has an order of at least 2.

* * * * *